United States Patent
Lehmann

(10) Patent No.: US 7,120,820 B2
(45) Date of Patent: Oct. 10, 2006

(54) REDUNDANT CONTROL SYSTEM AND CONTROL COMPUTER AND PERIPHERAL UNIT FOR A CONTROL SYSTEM OF THIS TYPE

(75) Inventor: Ulrich Lehmann, Woerth (DE)

(73) Assignee: Siemens Aktiengesellschaft, Munich (DE)

( * ) Notice: Subject to any disclaimer, the term of this patent is extended or adjusted under 35 U.S.C. 154(b) by 483 days.

(21) Appl. No.: 10/329,543

(22) Filed: Dec. 27, 2002

(65) Prior Publication Data

US 2003/0140270 A1 Jul. 24, 2003

Related U.S. Application Data

(63) Continuation of application No. PCT/DE01/02331, filed on Jun. 27, 2001.

(30) Foreign Application Priority Data

Jun. 27, 2000 (DE) ................................ 100 30 329

(51) Int. Cl.
*G06F 11/00* (2006.01)
(52) U.S. Cl. ............................................ 714/4; 714/11
(58) Field of Classification Search .................. 714/12, 714/44, 4, 48, 11
See application file for complete search history.

(56) References Cited

U.S. PATENT DOCUMENTS 6,542,924 B1 * 4/2003 Abe ............................ 709/208

FOREIGN PATENT DOCUMENTS

| DE | 198 14 096 A1 | 10/1999 |
| EP | 0 216 372 A2 | 4/1987 |
| EP | 0 478 288 B1 | 4/1992 |
| WO | WO 91/08535 A1 | 6/1991 |
| WO | WO 99/50726 A1 | 10/1999 |

OTHER PUBLICATIONS

Siemens Catalog CA 01, Siemens AG, Automation & Drives, 1999 (Jun. 13, 2000).

* cited by examiner

*Primary Examiner*—Robert Beausoliel
*Assistant Examiner*—Yolanda L. Wilson
(74) *Attorney, Agent, or Firm*—Sughrue Mion, PLLC

(57) ABSTRACT

A redundant control system having at least a first and a second control computer (1,2) and at least one peripheral unit (5) that is connected to the control computers (1,2) by a bus system (3,4). Both control computers transmit cyclically changing signs of life (LzX, LzY) to the peripheral unit (5), which checks whether a change in the signs life has taken place within a given time period and which switches to the other control computer for executing the control tasks if the change in the sign of life is not timely received.

21 Claims, 1 Drawing Sheet

REDUNDANT CONTROL SYSTEM AND CONTROL COMPUTER AND PERIPHERAL UNIT FOR A CONTROL SYSTEM OF THIS TYPE

This is a Continuation of International Application PCT/DE01/02331, with an international filing date of Jun. 27, 2001, which was published under PCT Article 21(2) in German, and the disclosure of which is incorporated into this application by reference.

FIELD OF AND BACKGROUND OF THE INVENTION

The present invention relates to a redundant control system and an associated control computer, peripheral unit and method for such a control system.

The high-service-quality automation system S7–400H, having a redundantly designed construction and the interface connection IM153–2, which is usable for connecting a peripheral unit ET 200M as a slave in redundant PROFIBUS-DP systems having the S7–400H, is known from Siemens catalog CA 01, 1999. This catalog was, e.g. viewable on Jun. 13, 2000 in the internet at the address http://www3.ad.siemens.de/ca01online.

In many fields of automation technology, ever more stringent requirements are placed on the service quality, and therefore on the fault tolerance, of the automation systems. There are fields in which a system stoppage would be very costly. In these cases, only redundant systems are able to meet the requirements for service quality. For example, the high-service-quality SIMATIC S7–400H continues to operate even if parts of the control system have failed due to one or more faults. It has redundantly designed central functions and is constructed using two separate central controllers as control computers. The two control computers execute the same processing programs cyclically and synchronously. They monitor each other and automatically determine which control computer is active, i.e., actually controls the process via its output data. For this purpose, data is exchanged between the two control computers via a redundancy coupling. A decentralized peripheral unit ET 200M, into which application-specific digital input/output assemblies are plugged, is coupled, using a field bus PROFIBUS-DP, to each of the two control computers. Here, the peripheral units may of course be implemented to be redundant as well.

Process information obtained with the aid of measuring transducers is relayed to both control computers by the peripheral unit. In "hot standby" operation, if the system is healthy, both control computers execute the same control program simultaneously. However, only one control computer is active, i.e., the output data of only one control computer is processed further to control the process. In case of a fault, the intact central controller takes over the control of the process alone. For this purpose, the controllers automatically receive the same user program, the same data components, the same process image contents, and the same internal data, such as times, counters, flags, etc. In this way, both controllers are always at the current state and, in case of a fault, may continue the control alone at any time. Process output data, through which the signals to be output to the actuators of the peripheral unit are selected, are provided to the peripheral unit via both field buses in normal operation. However, the peripheral unit analyzes only one set of control data received from the field buses. The control computer connected at any given time can therefore be referred to as the active control computer. If the respective active control computer fails, process output data is no longer transmitted by this control computer via the field bus, and the peripheral unit changes over to the other control computer after a predetermined monitoring time has passed. In other words, the telegrams of the other field bus are analyzed in order to generate appropriate signals for the attached actuators. The changeover therefore occurs only after serious malfunctions, which lead to failure of a field bus.

Despite the resulting overall service quality, the above-described automation system suffers from long changeover times, which are a function of the telegram cycle times. This conventional automation system also suffers from an incomplete monitoring of the transmission chain, since merely the receipt of telegrams is sufficient to establish an intact field bus, and corruption therefore remains unrecognized.

OBJECTS OF THE INVENTION

Accordingly, primary objects of the present invention are to provide a redundant control system, as well as a control computer and a peripheral unit for such a control system, which are robust and insensitive to malfunctions and are characterized by a simple construction.

SUMMARY OF THE INVENTION

According to one formulation of the invention, these and other objects are achieved with a redundant control system that includes: at least one first control computer and one second control computer; at least one peripheral unit; and at least one bus system connecting the peripheral unit to the first control computer and to the second control computer for exchange of control data. The peripheral unit analyzes control data from only one of the control computers to execute a control task. The first control computer and the second control computer transmit cyclically changing signs of life to the peripheral unit via the bus system. Finally, the peripheral unit checks whether a change of a sign of life has occurred within a predetermined duration, and, in the absence of the change, the peripheral unit recognizes a fault of a respective one of the control computers and changes over to another of the control computers to execute the control task. Any and all embodiments of such a control system, as well as a control computer and a peripheral unit for a control system of this type, are also encompassed by the present invention.

According to another formulation, the present invention is further directed to a method involving: transmitting control data and first signs of life from a first control computer to a peripheral unit; transmitting the control data and second signs of life from a second control computer to the peripheral unit, wherein the first signs of life differ from the second signs of life; monitoring receipt of the first signs of life and the second signs of life in the peripheral unit; processing the control data from the first control computer in the peripheral unit if the first signs of life are received in said monitoring step; and switching to processing the control data from the second control computer in the peripheral unit if the first signs of life are not received in said monitoring step.

The present invention has one advantage that the same bus system may be used for transmitting the signs of life that is already being used for transmitting the control data, and is therefore already present in any case. Additional communication channels are not necessary. Through the cyclic change in the signs of life, an artificial signal dynamic response is provided, which allows monitoring of the entire transmission chain between the control computer and the peripheral unit. In addition, the activity of the control computer is monitored by the changes in the signs of life, since the control computer must execute the changes in the signs of life. The active control computer can easily cause a changeover to the other control computer, to execute the control tasks, by either not transmitting signs of life to the peripheral unit at all or by transmitting signs of life which fail to change. In this way, seamless changeover without loss of control data is possible. This measure is expedient, for example, in order to initiate changeover in the event of partial failures, e.g. determined during the self-diagnosis of the active control computer.

In addition, the peripheral unit can initiate the changeover to the other control computer, e.g. in the event that the previously active control computer has failed abruptly and therefore cannot initiate a changeover itself in the manner described above.

Preferably, a redundant control system according to the invention covers both those situations in which both control computers operate normally and those in which both control computers are defective. In the first case, the currently active control computer is left in this state and in the latter case, which may be readily determined by the peripheral unit on the basis of the absence of signs of life from both control computers, the peripheral unit steers the process into a safe state through suitable predetermined output signals.

The peripheral unit can use telegrams, which the peripheral unit sends to the two control computers via the bus system, to communicate the current state to the computers, i.e., which control computer is currently active. In addition, by transmitting the signs of life from the control computers to the peripheral unit via the bus system, all relevant transmission links of the transmission chain, e.g., communication processors, plugs, bus cables, etc., are included in the monitoring, so that any failure in these links is also recognized.

If the two control computers execute the same control program in healthy operation, seamless changeover is advantageously ensured.

The present invention additionally provides for intentional changeovers in addition to and in combination with the above-described monitoring feature. The intentional changeover is advantageously made possible if the two control computers transmit signs of life which each have different valences. If a control computer recognizes a lower-order malfunction e.g. with the help of its self-diagnosis function, it can initiate a changeover to the other control computer by reducing the valence of its sign of life. A lower-order malfunction may be, for example, a non-conforming memory signature, which is determined during memory monitoring, before the control computer uses this memory area, and which therefore does not lead directly to failure of the control computer. Through the early changeover, further improvement of the insensitivity of the redundant control system to malfunctions is achieved.

Transmission of the signs of life within the regular telegrams for the control data has the advantage that no separate telegrams for the signs of life are necessary in addition to the cyclic control data telegrams, which are exchanged anyway between the control computers and the peripheral unit. A 'telegram overhead,' which would be necessary for transmitting separate sign of life telegrams, e.g. for addressing in the bus system, and which would reduce the transmission speed of the useful data, therefore does not arise.

BRIEF DESCRIPTION OF THE DRAWINGS

In the following, the present invention as well as embodiments and advantages thereof are described in more detail with reference to the single drawing figure labeled FIG. 1, in which a redundant control system is illustrated as an exemplary embodiment of the present invention.

DETAILED DESCRIPTION OF THE PREFERRED EMBODIMENTS

Figure 1:
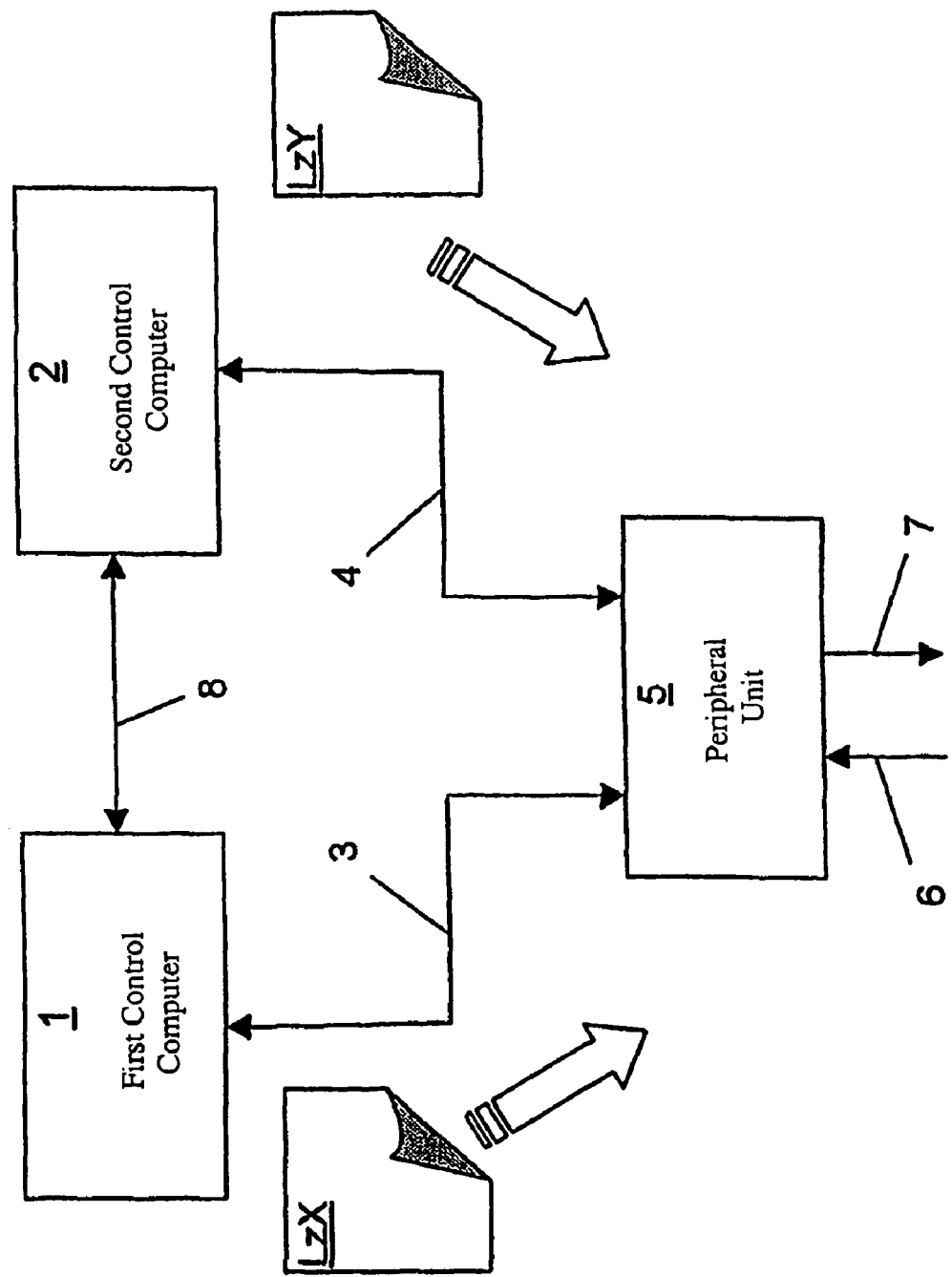

FIG. 1 depicts a first control computer 1 and a second control computer 2 are each connected via a field bus 3 and 4, respectively, to a peripheral unit 5. Preferably, the field buses 3 and 4 fulfill the PROFIBUS-DP specification. In principle, other bus systems, for example, ethernet, field bus, etc., but even parallel bus systems, are also suitable. Peripheral unit 5 receives signals, which are used to detect a process state, from measuring transducers via input lines 6, and outputs signals, through which the process is influenced, to actuators via output lines 7. The particular process as well as the measuring transducers and actuators are not illustrated in the figure for reasons of conciseness and clarity. Both control computers 1 and 2 execute the same control program cyclically and synchronously. A redundancy coupling 8 is provided for the synchronization. The redundancy and monitoring functions may be implemented—if necessary—via the redundancy coupling 8 in a conventional manner and will therefore not be discussed in more detail in the following.

In addition to the control data, which is exchanged in a conventional fashion between the control computer 1 and the peripheral unit 5 via the field bus 3 and between the control computer 2 and the peripheral unit 5 via the field bus 4, the control computer 1 transmits signs of life LzX via the field bus 3 and the control computer 2 transmits signs of life LzY via the field bus 4 to the peripheral unit 5. The signs of life LzX have a higher valence than the signs of life LzY. The content of the signs of life LzX alternately comprises a first code, for example, a hexadecimal number 55, and a second code, for example, a hexadecimal number AA. The signs of life LzY are represented by a third code, for example, hexadecimal number 33, and a fourth code, for example, hexadecimal number CC.

The signs of life LzX and LzY are transmitted to the peripheral unit 5 within the regular telegrams, which contain the control data to be transmitted anyway,. Moreover, the signs of life LzX and LzY are transmitted cyclically using the time period of the program cycle time of the most rapid application of the control computers 1 and 2. In this way, the automation system changes between the first and the second code of the sign of life LzX and correspondingly changes between the third and the fourth code of the sign of life LzY using the program cycle time of the most rapid application performed.

The peripheral unit has a local intelligence and checks whether a change in the signs of life LzX and LzY has occurred within a predefined duration, which should be set longer than the program cycle time of the most rapid application of the control computers 1 and 2. In the event there is no change, the peripheral unit 5 recognizes that a fault of the respective control computer 1 and/or 2 has occurred. Technical oscillations in the duration of the period of the sign of life change can be taken into consideration easily by suitably setting the duration.

During healthy operation, to generate the process output signals, the peripheral unit 5 analyzes the control data that it receives via the field bus 3 from the first control computer 1, since this computer transmits higher value signs of life LzX. This state is maintained even in situations where the second control computer 2 also transmits signs of life LzX, i.e., signs of life having the same valence as the signs of life from the first control computer 1, to peripheral unit 5, in situations where no signs of life are to be received from the second control computer 2, or in situations where the first control computer 1 reduces the valence of its signs of life LzX to the valence of the signs of life LzY of the second control computer 2. On the other hand, the control data received via the field bus 4 is analyzed in the peripheral unit 5, i.e., a changeover is made to the second computer 2 to perform the control tasks, if the first control computer 1 transmits signs of life LzY of a lower valence and the second control computer 2 transmits signs of life LzX of a higher valence, or if the peripheral unit 5 no longer receives signs of life at all from the first control computer 1. If signs of life are no longer received from either of the control computers 1 and 2, a double fault has occurred and the process to be controlled is put into a safe state by outputting suitable process output signals 7.

With the aid of the mechanism described, signs of life LzX and LzY of different valences are therefore used both for monitoring the control computers and their communication connections and for active changeover. In summary, it may be said that, for analyzing the control data received, the peripheral unit 5 prefers the field bus on which the sign of life LzX is offered. However, it is also content with the sign of life LzY if no other higher value sign of life is offered. A changeover to another control computer to perform the control tasks may be readily initiated simply by switching the signs of life LzX and LzY.

In the following, several failure scenarios are described:

EXAMPLE 1

Initially, both control computers 1 and 2 are error-free, and the control computer 1 is active.

After a serious malfunction, e.g., a power supply malfunction, the control computer 1 abruptly fails.

The peripheral unit 5 recognizes the failure of the first control computer 1 immediately after the predefined monitoring time for the sign of life has passed and changes over to second control computer 2. Since current data from the second computer 2 is always offered on the field bus 4, the changeover is seamless.

In addition, the peripheral unit 5 can communicate the field bus change to the now active control computer 2 in a telegram. The second control computer 2 can thereupon replace its sign of life LzY with the sign of life LzX of higher valence.

EXAMPLE 2

Again, both control computers are initially error-free and the first control computer 1 is active.

The first computer 1 recognizes, by way of a self-monitoring function, a lower-order malfunction, for example, a non-conforming memory signature, which does not lead directly to failure of the first control computer 1.

As a reaction, the first control computer 1 and the second control computer 2 initiate a change of their state. For this purpose, the second computer 2 first changes over from transmitting the sign of life LzY to transmitting the sign of life LzX. Subsequently, the first control computer 1 changes and now transmits, instead of the previous sign of life LzX, the new sign of life LzY. The peripheral unit 5 reacts immediately with a changeover to the now active control computer 2, as soon as the first control computer 1 has completed the change of the transmitted sign of life valence.

The peripheral unit 5 may again communicate the change of the field bus to the now active control computer 2 in a telegram.

The predefined duration, within which a change in the sign of life must occur in the healthy case, can be set during configuration. The configuration costs necessary for this purpose and the uncertainties connected therewith may be dispensed with if the peripheral unit 5 sets the monitoring time through self-learning. For this purpose, the peripheral unit 5 observes the change in the signs of life LzX and LzY after a start of the redundant control system for a selected maximum time. As soon as the cycle time of the sign of life change is determined, a safety margin is added to this time, and the resulting time is stored as the monitoring time, i.e. as the predefined duration.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An automation system with redundant control comprising:
    at least one first control computer and one second control computer;
    at least one peripheral unit; and
    at least one bus system connecting the peripheral unit to the first control computer and to the second control computer for exchange of control data;
    wherein the peripheral unit analyzes control data from only one of the control computers to execute a control task;
    wherein the first control computer and the second control computer transmit cyclically changing signs of life to the peripheral unit via the bus system; and
    wherein the peripheral unit checks whether a change of a sign of life has occurred within a predetermined duration, and, in the absence of the change, the peripheral unit recognizes a fault of a respective one of the control computers and changes over to another of the control computers to execute the control task.

2. The automation system with the redundant control according to claim 1, wherein the control computers each execute the same control program.

3. The automation system with the redundant control according to claim 1, wherein the control computers transmit signs of life that have respectively differing valences.

4. The automation system with the redundant control system according to claim 1, wherein the control computers transmit the signs of life within regular control data telegrams.

5. The automation system with the redundant control according to claim 1, wherein, when the signs of life transmitted from the first computer cyclically change value, the peripheral unit determines that the first computer is operational, and wherein the first computer and the second computer execute same processes at at least approximately same time, forming the redundant control.

6. The automation system with the redundant control according to claim 1, wherein, when one of: the signs of life is not received from a transmitting computer and value of the signs of life is not cyclically changed, the peripheral unit switches to the other computer.

7. The automation system with the redundant control according to claim 1, wherein the peripheral unit is connected to at least one component of the automation system and detects a state of the at least one component.

8. The automation system with the redundant control according to claim 1, wherein each of the first and second computers transmits the cyclically changing signs of life.

9. The automation system with the redundant control according to claim 8, wherein the peripheral unit determines a transmitting computer by comparing first cyclically changing signs of life transmitted from the first computer with second cyclically changing signs of life transmitted from the second computer.

10. The automation system with the redundant control according to claim 9, wherein, when a minor fault occurs in the transmitting computer, valence of the cyclically changing signs of life of the transmitting computer is decreased.

11. A peripheral unit for a redundant control system, said control system having at least two control computers and at least the one peripheral unit connected via at least one bus system to the control computers for exchanging control data, and said peripheral unit analyzing control data from only one of the two control computers for executing a control task;
   wherein said peripheral unit checks whether a change of a sign of life has occurred within a given duration, and, in absence of the change, recognizes a fault of a respective one of the control computers and switches from the respective one control computer to the other control computer in order to execute the control task.

12. A method comprising:
   transmitting control data and first signs of life from a first control computer to a peripheral unit;
   transmitting the control data and second signs of life from a second control computer to the peripheral unit, wherein the first signs of life differ from the second signs of life;
   monitoring receipt of the first signs of life and the second signs of life in the peripheral unit;
   processing the control data from the first control computer in the peripheral unit if the first signs of life are received in said monitoring step; and
   switching to processing the control data from the second control computer in the peripheral unit if the first signs of life are not received in said monitoring step.

13. The method according to claim 12, wherein the first signs of life vary cyclically and the second signs of life vary cyclically.

14. The method according to claim 12, wherein, during normal operation of the first control computer, the first signs of life have a valence that is higher than a valence of the second signs of life; and wherein, during abnormal operation of the first control computer, the first signs of life have a valence that is lower than a valence of the second signs of life.

15. The method according to claim 14, further comprising:
   switching to processing the control data from the second control computer in the peripheral unit if the valence of the second signs of life is determined to be higher than the valence of the first signs of life in said monitoring step.

16. The method according to claim 12, wherein said monitoring is performed in cycles of predetermined duration.

17. The method according to claim 16, further comprising:
   setting the predetermined duration in the peripheral unit after a given number of the cycles and based on data gathered on delays in the receipt of the first signs of life and the second signs of life in the peripheral unit over the given number of the cycles.

18. The method according to claim 12, wherein the peripheral unit monitors processes executed by components of an automation system.

19. The method according to claim 12, wherein value of the first signs of life changes every cycle when the first computer is operational and wherein value of the second signs of life changes every cycle when the second computer is operational, and wherein, each cycle, the first computer transmits the first signs of life and the second computer transmits the second signs of life.

20. The method according to claim 19, wherein, when the value of the first signs of life does not change every cycle, the switching from the first computer to the second computer is executed.

21. The method according to claim 12, wherein, each cycle the peripheral unit receives the first signs of life and the second signs of life and wherein the first signs of life and the second signs of life are cyclically changing.

* * * * *